United States Patent
Coile et al.

[11] Patent Number: 6,108,300
[45] Date of Patent: Aug. 22, 2000

[54] METHOD AND APPARATUS FOR TRANSPARENTLY PROVIDING A FAILOVER NETWORK DEVICE

[75] Inventors: Brantley W. Coile, Athens; James A. Jordan, Lawrenceville, both of Ga.

[73] Assignee: Cisco Technology, Inc, San Jose, Calif.

[21] Appl. No.: 08/918,024

[22] Filed: Aug. 25, 1997

Related U.S. Application Data

[63] Continuation-in-part of application No. 08/850,248, May 2, 1997, which is a continuation-in-part of application No. 08/850,730, May 2, 1997, which is a continuation-in-part of application No. 08/850,836, May 2, 1997.

[51] Int. Cl.[7] .............................. G06F 11/00; H04B 1/74; H04L 1/00
[52] U.S. Cl. .............................. 370/217; 370/222; 714/4; 340/825.01
[58] Field of Search .................................... 370/216, 217, 370/218, 219, 221, 908, 909, 222; 714/2, 3, 4; 340/825.01, 825.52

[56] References Cited

U.S. PATENT DOCUMENTS

| | | | |
|---|---|---|---|
| 4,700,348 | 10/1987 | Ise et al. | 370/217 |
| 5,016,244 | 5/1991 | Massey, Jr. et al. | 370/217 |
| 5,515,418 | 5/1996 | Yamaguchi et al. | 370/216 |
| 5,581,542 | 12/1996 | Kato et al. | 370/219 |
| 5,661,719 | 8/1997 | Townsend et al. | 370/216 |

*Primary Examiner*—Alpus H. Hsu
*Assistant Examiner*—Afsar M. Qureshi
*Attorney, Agent, or Firm*—Ritter, Van Pelt & Yi LLP

[57] ABSTRACT

A system and method are disclosed for transferring a network function from a primary network device to a backup network device. The backup network device first detects that the primary network device has failed. The backup network device then sends a message to the primary network device indicating to the primary network device that the primary network device has failed. The IP address of the backup network device changes from a standby IP address to an active IP address, and the IP address of the primary network device changes from the active IP address to the standby IP address. Packets sent to the active IP address are then handled with the backup network device.

24 Claims, 9 Drawing Sheets

METHOD AND APPARATUS FOR TRANSPARENTLY PROVIDING A FAILOVER NETWORK DEVICE

CROSS REFERENCE TO RELATED APPLICATIONS

This application is a continuation in part of co-pending U.S. patent application Ser. Nos. 08/850,248, 08/850,730 and 08/850,836, all filed May 2, 1997, (Attorney Docket Nos. CISCP005, CISCP007. and CISCP008) which are incorporated herein by reference for all purposes.

This application is related to co-pending U.S. patent application Ser. No. 08/920,211 (Attorney Docket No CISCP013 filed concurrently herewith, which is incorporated herein by reference for all purposes.

BACKGROUND OF THE INVENTION

1. Field of the Invention

The present invention relates generally to methods and apparatuses for transparently providing a failover network device. Specifically, the present invention provides in one embodiment a system for transferring a network function from an active network device to a standby device that is configured the same as the active device but does not become active until the active device fails. The active device and the standby device communicate with each other both over the network and over a separate failover cable that is configured to designate which device is primary and which device is secondary. If both devices start up at the same time, then the primary device becomes active and the secondary device becomes standby. When a positive determination is made that the active device has failed, the secondary device becomes active and assumes the duties of the failed primary device. This procedure occurs without the need for other network devices to change the MAC or IP address to which they are directing packets. The backup network device takes over the active MAC and IP addresses from the failed network device and supports connections to those addresses.

2. Description of the Related Art

Services provided over networks, intranets, and internets have been increasing in complexity. As a result, increasingly complex schemes have been developed to respond to client generated network traffic and to service client requests. In some of these schemes, a single device is placed on the network that is responsible to direct packets other devices or to filter packets that are bound for a number of other devices for some purpose such as security or load balancing. Such devices, when implemented, are critical to the operation of a network because they often represent a single point of failure that may prevent either the entire network or a substantial portion of the network from functioning.

One such critical device is a Local Director as described in U.S. patent application Ser. Nos. 08/850,248, 08/850,730 and 08/850,836 (Attorney Docket Nos. CISCP005, CISCP007. and CISCP008) which were incorporated by reference above. In one implementation, the Local Director is a device for spreading connections made by clients to a given IP address among a number of servers. The Local Director includes a session distribution scheme that efficiently distributes the connection load among a group of servers by determining which server available to it is likely to be able to efficiently handle the load.

In a forward multiplexing mode, the Local Director not only distributes connections for a single IP address to many network devices, but also distributes connections for many different IP addresses to different ports of a single network device that runs applications that service connections for the different IP addresses. The Local Director may implement a large number of virtual network devices which service connections using a set of physical network devices that are made available to the Local Director. The system is an especially robust one because certain physical network devices can be configured as backups for other physical network devices that support a virtual network device. In fact, in one embodiment, virtual network devices that each access a group of physical network devices to handle connections may be defined as backups for each other.

The flexibility of the Local Director in selecting different physical or virtual network devices to handle incoming connection requests is an advantage since failure of individual network devices will not seriously degrade network performance so long as other physical network devices available to the Local Director are capable of assuming more of the load. On the other hand, the presence of the Local Director on the network as a central distribution point that distributes connections among a large number of physical network devices could present a significant danger for catastrophic system failure. The Local Director is a potential single point of failure that could prevent the use of potentially all of the servers connected to it. Such a single point of failure in a network system is unacceptable in many systems. What is needed, therefore, is a reliable failover system that provides a backup for the Local Director.

FIG. 1 is a block diagram illustrating a typical backup system. A client 100 is connected to a primary network device 110 that provides some sort of network service. In the example shown, client 100 is connected to a number of physical servers, 112a, 112b and 112c. The physical servers actually handle connection requests made by the client, and connections are distributed to the physical servers by the primary network device. Thus, if the primary network device fails, the physical servers will be unable to service connections requested by a client 100. The primary network device 110 is therefore a potential single point of failure. In order to prevent the failure of the primary network device 110 from shutting down the entire system, a backup network device 120 is provided. The backup network device 120 may or may not be physically connected to the physical servers while the primary network device is operational. When primary network device 110 fails, then backup network device 120 either makes a physical connection to the physical servers or utilizes its already existing physical connection to take over the function of primary network device 110 and distribute service client connection requests.

The switch from primary network device 110 to backup network device 120 requires the client to sense that a failure has occurred. Client 100 stores the primary MAC address and primary IP address of primary network device 110 in a register 102. Client 100 continues to use the primary MAC address and primary IP address so long as primary network device 110 is operational. When primary network device 110 fails, client 100 must detect that failure and determine that a switch to the backup network device is necessary. The backup device MAC address and backup device IP address is stored at the client in a register 104. The client runs an application that changes from connecting to the primary MAC address and primary IP address to connecting to the backup MAC address and backup IP address. In this implementation, it is necessary that the client be able to detect failure of the primary network device. The client must also store a backup IP address and MAC address for the backup network device and must change the relevant packet headers accordingly so that they are sent to the backup network device when the primary network device fails.

Cisco Systems, Inc., in San Jose, Calif. has developed a Hot Standby Router Protocol (HSRP) that enables routers to be organized into groups, with one router selected as the active router and other routers in the group acting as hot standbys. It would be useful if a suitable hot standby scheme could be developed for other critical network devices such as the Local Director. To be effective, a failover system for a device such as the Local Director should provide a number of features. First, it is important that failure of the Local Director be detected quickly. Since the Local Director must intercept packets and translate addresses to direct connections among a large group of physical network devices, it is important to detect failure of the Local Director as soon as possible before a significant amount of network traffic backs up.

Avoiding a false indication of a failure is as important as quickly detecting failures that occur. When failures occur, it may not be practical to hand over connections from the failed Local Director to the backup. Connections therefore would be dropped and reestablished. Reestablishing multiple connections with the backup will likely generate a large volume of network traffic and could cause delay. Therefore it is important that the Local Director not be failed and traffic not be diverted to the backup unless an actual failure has occurred. It is also important that a condition where a Local Director is toggling between a failed mode and a good mode be avoided. This could occur, for example, if the Local Director is unable to process packets but appears to have a network interface that is functioning. Once the connection load is removed and transferred to the backup, the failed Local Director may appear normal. If the system were allowed to toggle back to the failed Local Director in such a case without intervention, repeated failures and transfers of connections would result.

Finally, it would be desirable if the failure of the primary Local Director and the subsequent transfer of connections to a backup Local Director could be effected without requiring any of the client devices connecting to the Local Director to detect the failure, determine that the failure occurred, or otherwise determine that a switch to a backup Local Director must be made. This is particularly important because one advantage of the Local Director is that in many applications, the client is unaware the Local Director exists. For example, in forward multiplexing mode, the Local Director intercepts packets sent to an IP address that corresponds to a virtual network device and translates the packet headers so that they are directed to a physical network device that may implement a large number of virtual network devices. In such an application, the client does not know that the virtual network device is a virtual device or that the Local Director even exists. It would therefore not be possible for the client to detect failure of the Local Director and route future requests to a backup Local Director. In addition, it is also be desirable that the transfer to a backup Local Director be made transparently so that it would not be evident to the client that a transfer occurred.

In view of the foregoing, there is a needed for methods and apparatuses for providing a reliable, transparent failover for a network device that would otherwise represent a single point of failure for a large system.

SUMMARY OF THE INVENTION

The present invention provides a failover for a network device. It should be appreciated that the present invention can be implemented in numerous ways, including as a process, an apparatus, a system, a device, a method, or a computer readable medium. Several inventive embodiments of the present invention are described below.

In one embodiment, a method of transferring a network function from a primary network device to a backup network device includes detecting at the backup network device that the primary network device has failed. The backup network device then sends a message to the primary network device indicating to the primary network device that the primary network device has failed. The IP address of the backup network device changes from a standby IP address to an active IP address, and the IP address of the primary network device changes from the active IP address to the standby IP address. Packets sent to the active IP address are then handled with the backup network device.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE PREFERRED EMBODIMENTS

Reference will now be made in detail to the preferred embodiment of the invention. An example of the preferred embodiment is illustrated in the accompanying drawings. While the invention will be described in conjunction with that preferred embodiment, it will be understood that it is not intended to limit the invention to one preferred embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The present invention may be utilized to provide a failover and a variety of network devices that represent a potential single point of failure. As mentioned above, providing a failover for a Local Director is one important embodiment of the present invention. In other embodiments, a failover for a web server, a proxy or firewall or other network device is provided.

Figure 1:
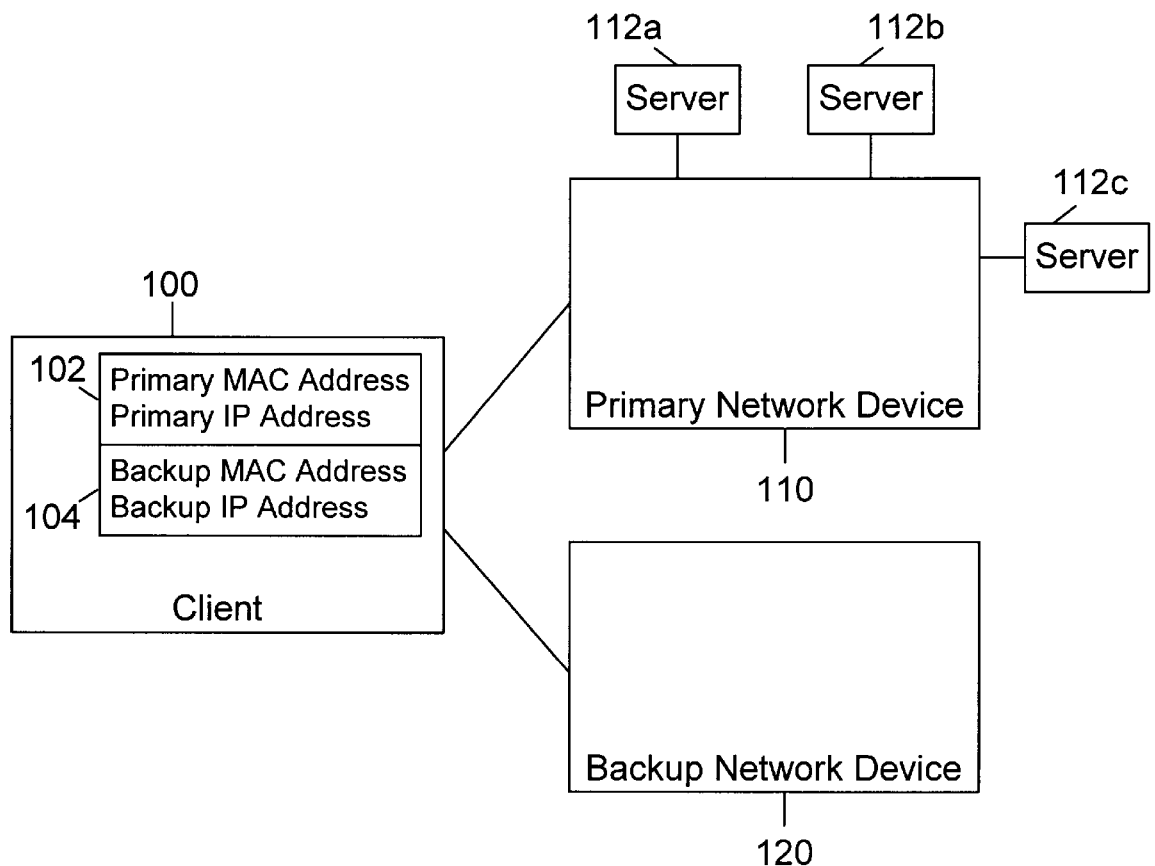
FIG. 1 is a block diagram illustrating a typical backup system.
Figure 2:
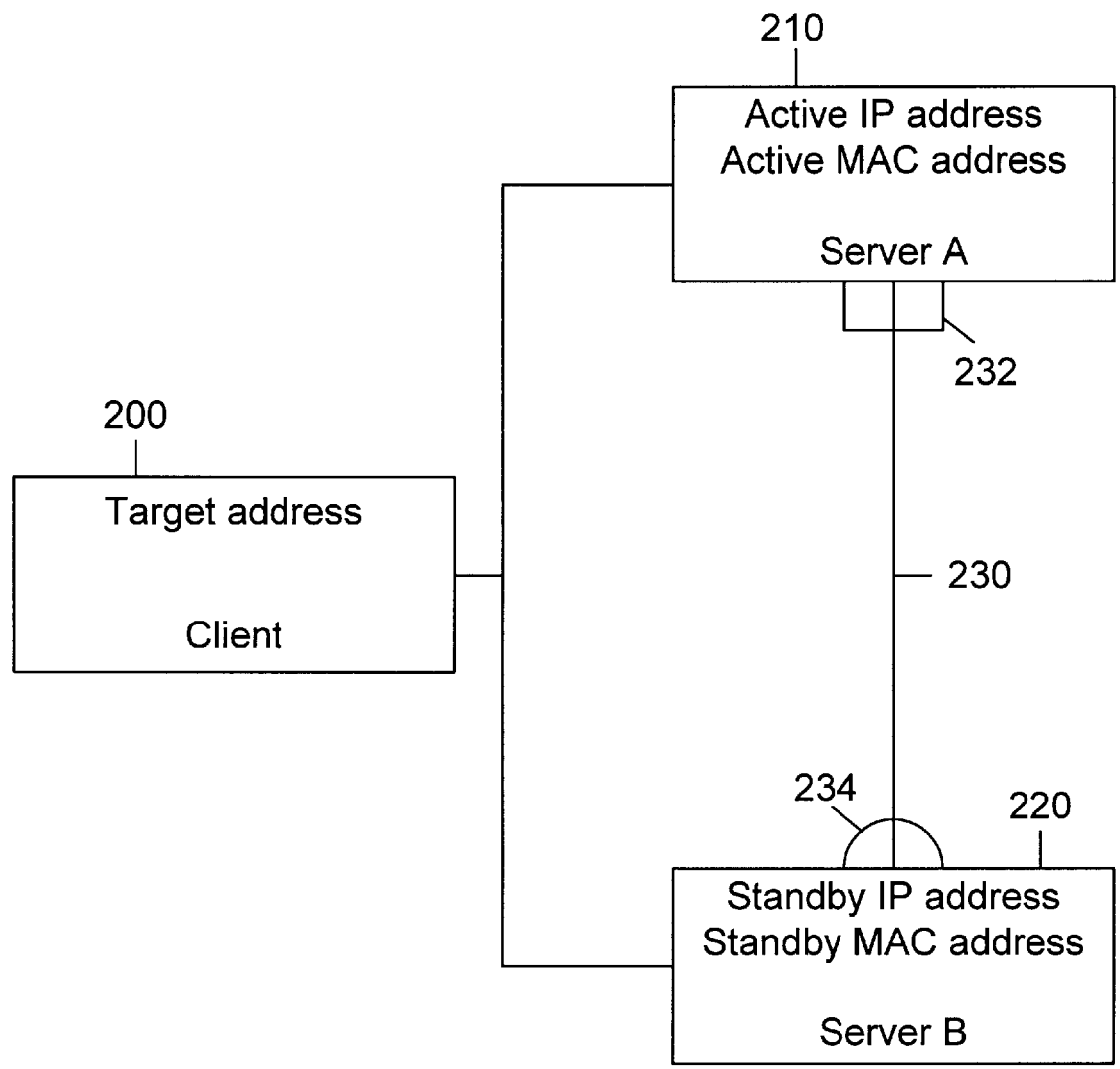
FIG. 2 is a block diagram illustrating a fail over system designed according to the present invention.

FIG. 2 is a block diagram illustrating a fail over system designed according to the present invention. A client 200 stores only the target IP address for the connection which the client desires to make. Client 200 does not store the active and standby IP and MAC addresses for a primary and backup server. A primary server 210 has adopted the active IP address and the active MAC address. In an embodiment providing a failover for a Local Director, the primary server also runs an application that causes it to intercept packets sent to the target IP address. The application may intercept a large number of target IP addresses if it is appropriately configured.

Server 210, which is that is functioning as the primary server, is labeled server A to indicate that it is not necessarily a primary or a secondary server by virtue of its own internal programming. Likewise, a server 220 that is functioning as a backup is labeled server B to indicate that it is not necessarily a primary or a secondary server by virtue of its own internal programming. Backup server 220 has adopted the standby IP address and the standby MAC address for the system. It should be noted in the following discussion that although the network devices shown are referred to as servers, they could also be other network devices running the proper protocols. Accordingly, they will be referred to interchangeably as servers or generically as network devices or units. It should also be noted that the designation of machines as clients or servers is meant to be illustrative only and that those functions may be interchanged in different embodiments.

A failover cable 230 connects primary server 210 and backup server 220. Failover cable 230 includes a primary end which terminates in a primary connector 232 and a backup end which terminates in a backup connector 234. The primary or backup status of server A and server B is determined by which end of failover cable 230 is plugged in to each server at a given time. Thus, network devices do not need to be internally configured in order to be set up as backups or primary network devices. This has numerous advantages including ease of setup and the fact that a primary network device need not be taken out of service when a backup network device is added to a system.

Because primary server 210 is in the active state and has not failed, it has adopted the active IP address and the active MAC address. It will respond to any packets sent to those addresses. In addition, the primary network server may be configured in certain embodiments to intercept packet sent to other addresses and to filter the packets, translate the packet addresses, or otherwise process the packets. Backup server 220, by virtue of its backup status assumes the standby status so long as primary server 210 has not failed. Backup server 220 receives and responds to packets directed to the standby IP address.

A MAC address is an address of a device at the sublayer of the data link layer, defined by the IEEE 802 committee that deals with issues specific to a particular type of LAN. The types of LAN for which MAC addresses are available include token ring, FDDI, and ethernet. A MAC address is generally intended to apply to a specific physical device no matter where it is plugged into the network. Thus, a MAC address is generally hardcoded into the device—on a router's ROM, for example. This should be distinguished from the case of a network layer address, described above, which changes depending upon where it is plugged into the network. MAC is an acronym for Media Access Control.. In one embodiment of the present invention, the active MAC address is adopted by the active network device and is therefore not assigned to only one device.

Primary server 210 and backup server 220 periodically confirm to each other that they have not failed. In one embodiment, the primary network device and the secondary network device communicate every 15 seconds on the network, each sending a message to the other indicating that it has not failed. If one of the devices fails to receive a confirmation message within the prescribed interval, then the network device transfers to a test mode where it tests whether or not its network card is functioning.

The network card is functioning if the network is able to receive messages from the network. When the network device enters test mode, it firsts listens for network traffic. If network traffic is detected during this phase of testing, then the network device determines that it is in fact receiving network traffic and so it concludes that the other network device has failed because had that network device successfully sent network traffic, it would have been received on the functioning network card. If no network traffic is detected, then the network device will, in other phases of testing, attempt to stimulate network traffic so that it can confirm that its network card is indeed functioning. The test process is described further in FIG. 6.

In addition to sending confirmation messages across the network, the primary network device and the secondary network device also send confirmation messages to each other periodically via the failover cable. This enables a failure of a remote device to be detected immediately over the cable without the need to test the network interface.

Figure 3:
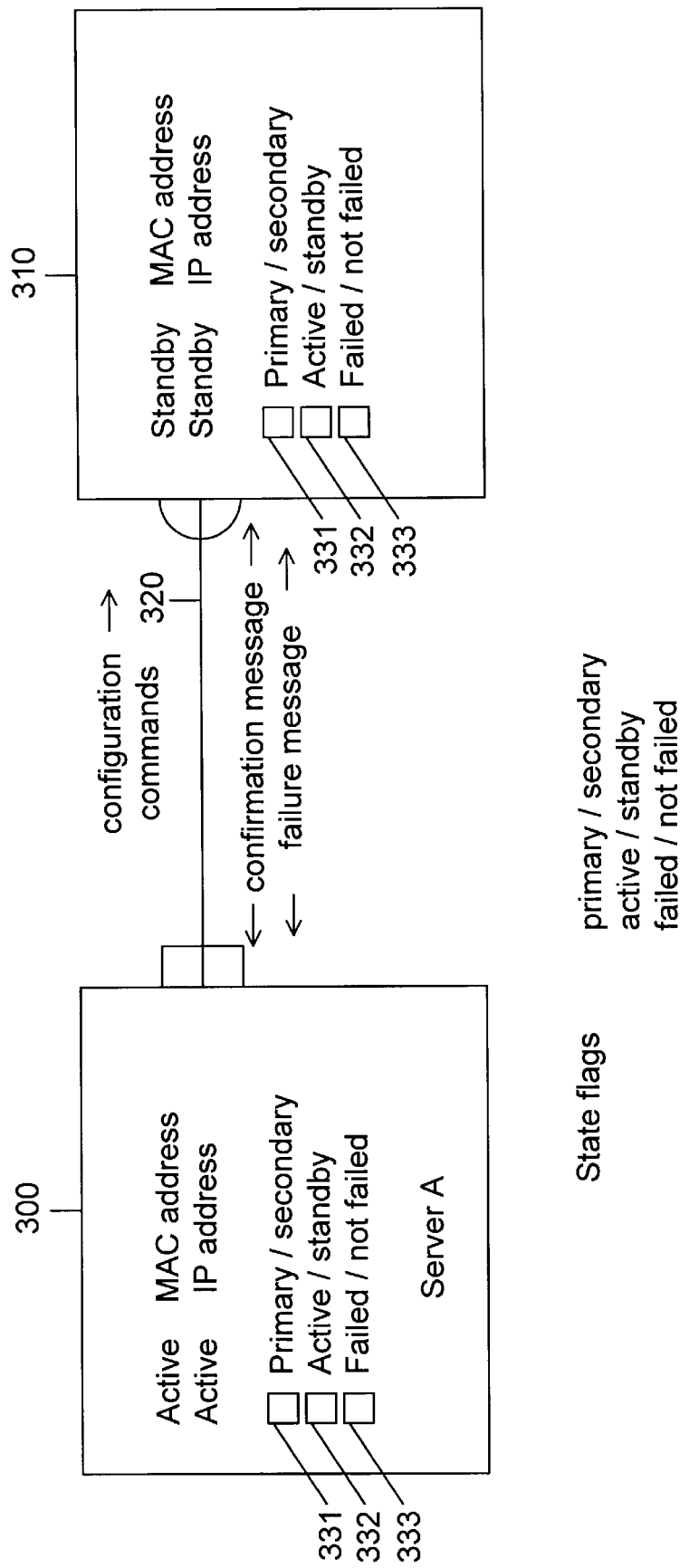
FIG. 3 is a block diagram further illustrating the communication between a primary network device and a secondary network device and the state flags in the two devices that keep track of the state of each device.

FIG. 3 is a block diagram further illustrating the communication between a primary network device 300 and a secondary network device 310 and the state flags in the two devices that keep track of the state of each device. So long as it is active, primary network device 300 sends configuration commands to secondary network device 310 over a failover cable 320 so that secondary network device 310 may mirror the configuration of 300 for the purpose of substituting for primary network device 300 in the event that primary network device 300 fails. In one embodiment, the primary network device also can send over its entire configuration in a single step if that is requested. In addition to primary network device 300 transmitting configuration commands to secondary network device 310, the two devices also periodically exchange confirmation messages on failover cable 320. The confirmation messages indicate that each of the network devices have not failed.

The confirmation messages sent along the failover cable compliment the confirmation messages sent via the network. When one of the network devices fails or determines that the other network device has failed, then a failure message indicating either that the sending network device has failed or that the receiving network device has failed is generated by the network device that determines that a failure has occurred. Since each network device receives an update of the status of the other network device from both the network and the failover cable, the backup network device learns of a failure in the primary network device and the primary network device learns of any failure in the backup network device. The backup network device becomes active upon confirmation of a failure in the primary network device. The primary network device in some embodiments refuses to fail itself even when a problem is detected when it knows that a backup device has failed and is not available to take over active status.

The communication of failure over the failover cable enables the system to avoid problems when the backup server fails the primary server. As mentioned above, when the backup server becomes active, it assumes both the active IP address and the active MAC address. Assuming the MAC address is advantageous since clients do not have to ARP and find out the MAC address of the new active server before they can connect. However, a problem could result if the former active device still responded to that MAC address. One problem would be that the switch might not be able to properly learn that the MAC address moved. Other ambiguities would likely occur. Since the former active device learns from the new active device that it failed, this is avoided and the former active device moves to the standby IP and MAC address. The former active network device can then stop attempting to service network traffic and send a message to the system administrator indicating that a failure has occurred It is important that the secondary network device not mistakenly fail the primary network device and cause all of the connections to the primary network device to be broken and reestablished with the secondary network device. The secondary network device therefore confirms that the primary network device has failed before it becomes active. The failover cable provides a quick confirmation that the primary network device has failed.

In one embodiment, each end of the cable is configured so that it can be detected if the cable is unplugged and it can also be detected which end of the cable is unplugged. A cable used in one embodiment is described in further detail in U.S. patent Ser. No. 08/920,211 (Attorney Docket No. CISCP013) which was previously incorporated by reference. The cable may also contain a circuit which indicates whether or not power is provided to each of the network devices. When power is lost at one of the network devices and it is confirmed that the cable is still plugged in, then the other network device immediately fails the network device that lost power and the failover procedure can be immediately implemented. As mentioned above, when a failure of the primary network device is detected by the secondary network device as a result of the primary network device failing to send a confirmation message over the network, the failover cable provides a way for the backup network device to indicate to the primary network device that it has failed.

Each network device also has a series of flags which indicate the status of the device. A primary/secondary flag 331 indicates whether the network device is a primary or secondary device. As noted above, the primary or secondary state is determined as a result of the end of the failover cable that is connected to the network device. An active/standby flag 332 indicates whether or not the network device is in active or standby mode. If the network device is the primary network device brought up in a timely manner and it is not failed, then the network device will be in active mode. The backup network device will initially be in standby mode and will transfer to active mode upon detecting that the primary network device has failed or is not there. A failed/not failed flag 333 indicates whether the network device has failed or not failed.

Figure 4:
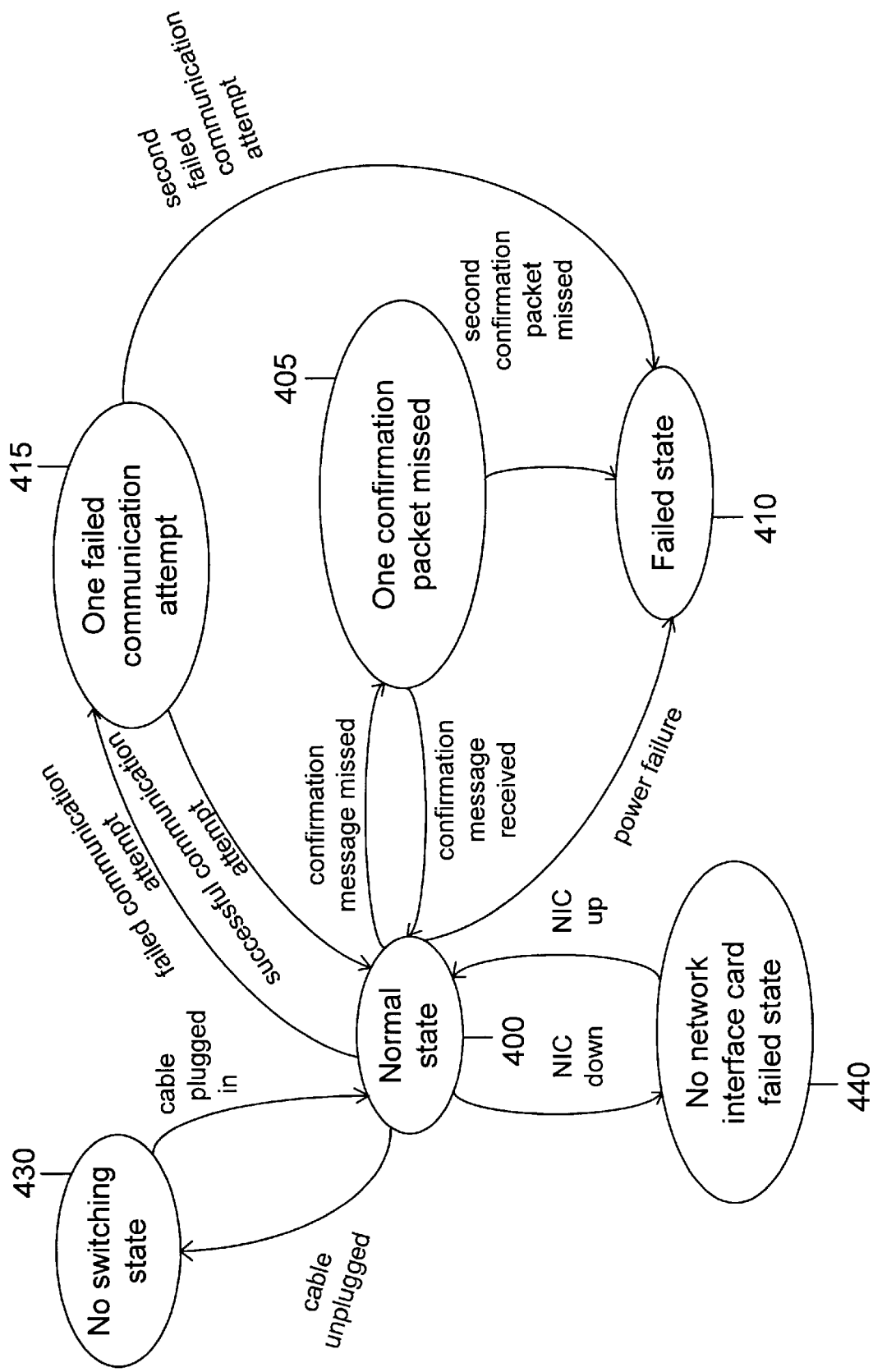
FIG. 4 is a state diagram illustrating the events which cause a network device to transition from the normal or not failed state to different intermediate states or failed states.

FIG. 4 is a state diagram illustrating the events which cause a network device to transition from the normal or not failed state to different intermediate states or failed states. It should be noted that in certain instances, the detection of the events which cause a network device to change state may occur either at the local network device or at a remote network device that detects the events and then send a message to the failed network device that the network device has failed. Thus, although the transition between states occurs as the result of events occurring at a local device, the detection of those events may actually be done by a remote device that reports the result of the events to the local network device.

For example, if a network device fails to send a confirmation message, that event will cause that network device to change state. However, the network device may not itself detect that it did not send a confirmation message. That event may be detected by the device to which the confirmation message should have been sent. The remote device will keep track of the state of the local network device that failed to send a confirmation message and will eventually notify the local device that it has failed and should transition to the failed state. Thus, a local device may itself be unaware that it has changed state although it will receive a message indicating its new state once a remote device has determined that it has failed.

It is helpful at this point to review the different state changes that may occur for a network device. First, a network device may either be in the active state or in the standby state. A network device in the active state handles packets according to its configuration. A network device in the standby state does not handle packets although its configuration mirrors that of a network device which is active. When the network device in the active state fails, then the network device in the standby state may become active. There is also a primary state and a backup state. When powered up, each network device may be in the primary state or backup state, depending on which end of the failover cable is connected to the network device. Whether a network device is in the primary or backup state, along with the state of other remote network devices will determine whether the local network device becomes active or standby. Finally, each device is in a state of being failed or not failed. The actual state of a device should be distinguished from the state indicated by the local state flags of the device. As noted above, in some instances, only a remote device may sense that a local device has failed. Until the remote device notifies the local device of its failed state, the local flags of the failed device may not indicate the failed state.

When a network device is powered up and no errors are detected, it initially is in a normal state 400. Periodically, the network device will send confirmation messages to a remote network device on the network. The local network device is aware of the existence of the remote network device as a result of the failover cable being plugged in to both network devices. In one embodiment, confirmation messages are sent every 15 seconds. If a confirmation message is missed, then the local network device transitions to a state 405 where one confirmation packet has been missed. If a confirmation message is later received, then the local network device will transition back to normal state 400. As described above, the state of the local network device is tracked or determined by the remote network device that receives the confirmation message and the local network device is not actually notified that it has transitioned to the state of one confirmation packet missed in some embodiments. If a second confirmation packet is missed, then the local network device transitions to a failed state 410. The remote network device will then notify the local network device over the failover cable if possible that the local network device has failed. If the remote network device detects a power failure from the local network device, then the local network device transitions directly to the failed state. It should also be noted that, preferably, all state transitions are noted in a syslog to the system administrator so that appropriate action may be taken.

In addition to sending a confirmation message over the network to the remote network device, the local network device also attempts to communicate to the remote network device over the failover cable periodically. In one embodiment, communication is attempted every 15 seconds. When a failed communication attempt occurs, then the local network device transitions to a state 415 where one communication attempt has failed. If a communication attempt is later successful, then the local network device returns to the normal state. If a second failed communication attempt occurs while the local network device is in the one failed communication attempt state, then the local network device transitions to failed state 410. Once in failed state 410, the local network device preferably will not transition back to the normal state without human intervention. In one embodiment, a transition is not made back to the normal state unless the power is cycled on the local network device and a command is sent to reset the local network device. This prevents a primary network device from toggling off and on and switching between active status and standby status, causing connection to be repeatedly made and broken with the backup network device.

Other events may cause the local network device to change state. If the cable is unplugged at either network device, then the local network device transitions to a no switching state 430. In no switching state 430, both network devices remain in either the active state or standby state and do not change state regardless or failures which are detected. In one embodiment, the failover cable plugs are configured so that it is possible to determine which side of the cable is unplugged, the primary side or the backup side. In one embodiment, regardless of which side is unplugged, both the primary and backup network devices enter the no switching state. Unlike failed communication attempts, cable unplug events are generally detected locally and each network device may change its own state.

When the network interface card (NIC) of one of the network devices is down, that network device transitions from the normal state to a state 440 where no network interface card is detected. Although this is a nonfunctioning state, when the network interface card is back up, the network device transitions back to normal state 400. In this respect state 440 differs from failed state 410, The network interface card may be down as a result of being configured as down or from being not plugged in.

Figure 5:
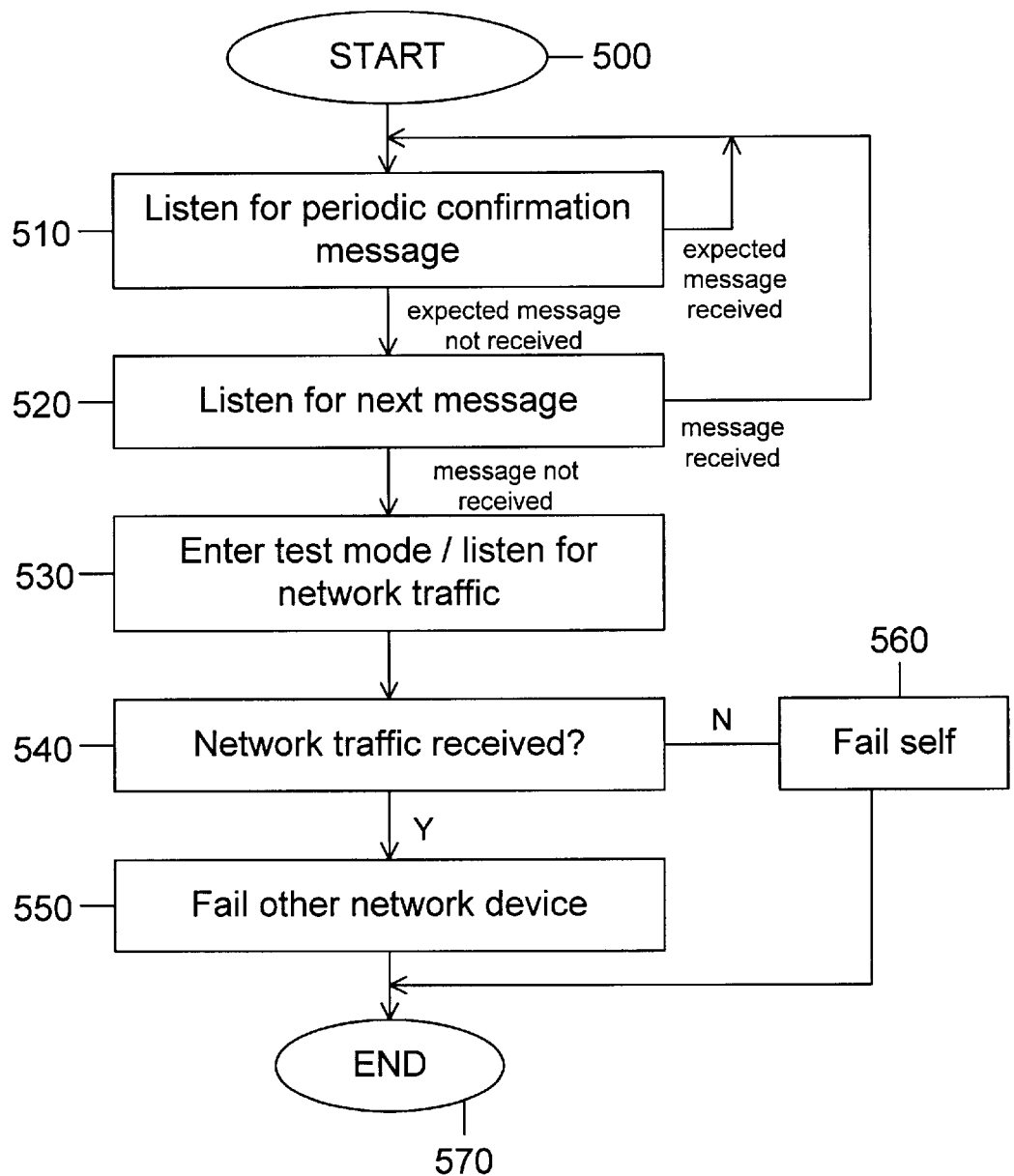
FIG. 5 is a process flow diagram illustrating the process for failing one of the network devices when an expected confirmation message is not received on the network.

FIG. 5 is a process flow diagram illustrating the process for failing one of the network devices when an expected confirmation message is not received on the network. The process starts at 500. In a step 510, the network device listens for a periodic confirmation message on the network. Each time the expected message is received, the process loops back and repeats step 510. When an expected message is not received within an expected time frame, then control is transferred to a step 520 and the network device continues to listen for the next confirmation message. If that message is received, then control is transferred to step 510 and the remote network device is not failed. If the message is not received within the expected time, then control is transferred to a step 530 and the local network device which did not receive the expected message enters test mode.

In test mode, the local network device listens for network traffic and tries to determine whether or not its network interface is functioning. During test mode, if any network traffic is received, a step 540 transfers control to a step 550 in which the remote network device is failed. The process run during test mode is further described in FIG. 6. If no network traffic is received while in test mode, then control is transferred to a step 560 and the local network device fails itself. The process ends at 570.

The process for failing a device when a communication attempt fails across the failover cable is similar. If a first communication attempt fails then the network device checks to see whether the next communication attempt is successful. If it is successful, then the network device returns back to the normal state. If the next communication is not successful, then the network device concludes that the remote network device that failed to communicate has failed. It should be noted that, in all cases, when a remote network device determines that a local network device has failed, the remote network device sends a message to the local network device on the failover cable telling the local network device that it has failed.

As noted above, the notification via the failover cable from a remote network device that a local network device has failed is an important feature that prevents switches on the network from being confused. Certain switches may have a physical connection to both the backup network device and the primary network device. Each switch has associated with each physical connection the MAC address that it is on that connection. As noted above, when the active and standby network devices change state, they also change MAC address and IP addresses. Thus, the switch will momentarily detect that a network device with a different MAC address then it expects has been physically connected to it. As long as the devices have traded IP and MAC addresses, the switch will eventually learn that the network has been reconfigured and a different device is physically connected to it at a different port. If however, a failed device continues to source traffic with the active MAC address, then the switch will not be able to learn that the active MAC address has moved over to the port on which the backup device, which is now active, is connected. The notification to the primary device via the failover cable allows the primary device to begin using the MAC and IP address of the standby device so that it does not interfere with the switch learning the location of the backup device which is active.

Figure 6:
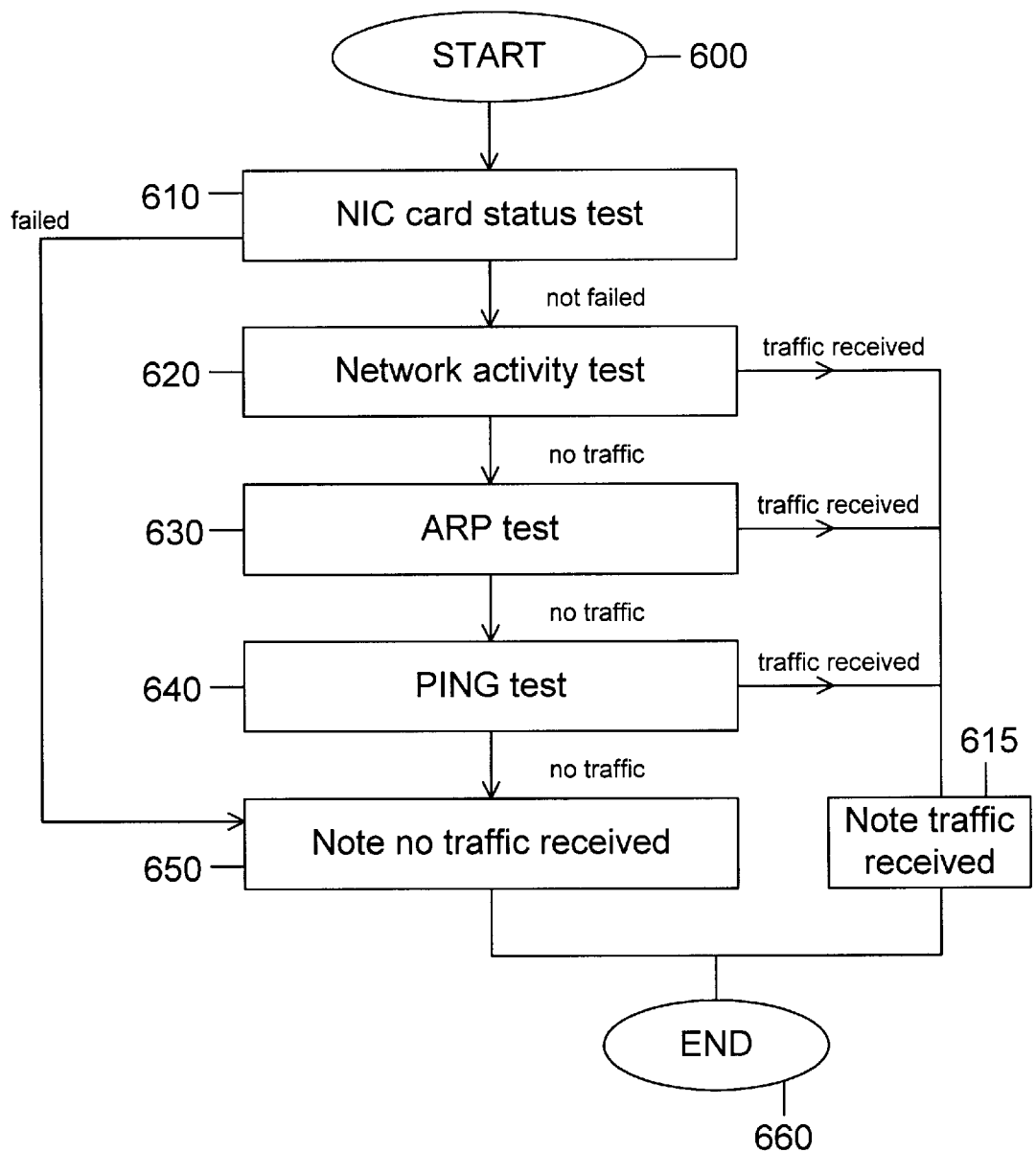
FIG. 6 is process flow diagram illustrating the steps that a network device executes in test mode as shown in step 530 of FIG. 5.

FIG. 6 is process flow diagram illustrating the steps that a network device executes in test mode as shown in step 530 of FIG. 5. The process starts at 600. In a step 610, the network device performs a network interface card status test. This test is a Link Up/Down test of the NIC card itself. If an interface card is not plugged into an operational network, it is considered failed. If the status test fails, then control is transferred to a step 650 and the network device notes that no traffic is received. As noted above, in FIG. 5, this will cause the network device to fail itself.

If the status test does not fail in step 610, then control is transferred to a step 620 and a network activity test is performed. This test is a received network activity test. The unit will count all received packets for up to 5 seconds. If any packets are received at any time during this interval the interface is considered operational and testing stops. If traffic is received, control is transferred to a step 615. If no traffic is received, then control is transferred to a step 630 where an ARP test is performed.

The ARP test consists of reading the units ARP cache for the 10 most recently acquired entries. One at a time, the unit then sends ARP requests to each machine attempting to stimulate network traffic. After each request the unit counts all received traffic for up to 5 seconds. If traffic is received, the interface is considered operational and then control is transferred to step 615. If no traffic is received, then control is transferred to a step 640 and a ping test is performed.

The PING test consists of sending out a broadcast PING request. The unit then counts all received packets for up to 5 seconds. If any packets are received at any time during this interval the interface is considered operational and testing stops. If traffic is received, then control is transferred to step 615. If no traffic is received, then control is transferred to step 650 and it is noted that no traffic was received. As noted in connection with FIG. 5, the device will then fail itself because its network interface is not working. The process ends at 660 when the device has concluded the test of its network interface and has either determined that it has failed or the remote device has failed. As noted above, failure of the remote device is confirmed by testing the local device interface card. If the local device is functioning properly on the network, then it is concluded that the remote device failed.

Figure 7:
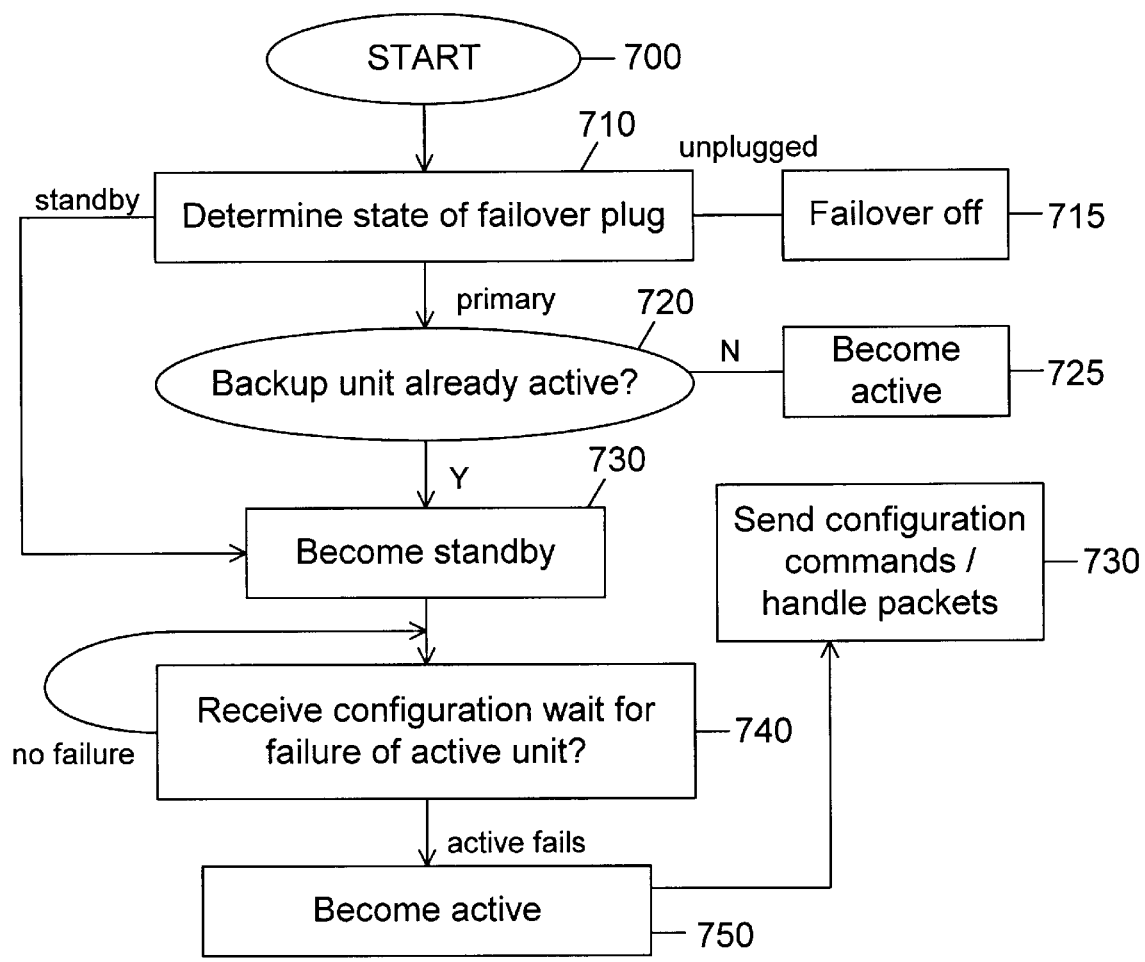
FIG. 7 is a process flow diagram illustrating the process implemented on each network device at startup.

FIG. 7 is a process flow diagram illustrating the process implemented on each network device at startup. The process starts in a step 700. In a step 710, the network device determines the state of the failover plug. If the failover plug is unplugged, then control is transferred to a step 715 and the failover mode is turned off. The network device becomes active or otherwise follows whatever policy is implemented when a failover backup network device is not installed. If the primary end of the cable is plugged in to the network device, then control is transferred to a step 720. In step 720, the network device checks whether the backup network device is already active. If the backup network device is not active, then control is transferred to a step 725 and the network device, which now has determined that it is the primary network device, becomes active.

In a step 730, the network device enters the state of sending its configuration commands to the backup network device over the failover cable and handling packets on the network in accordance with its configuration. If, in step 710, the network device determines that the standby end of the failover cable is plugged in to it, then control is transferred to a step 730 and the network device enters the standby state. Likewise, if, in step 720, the network device determines that the backup network device is already active, then control is transferred to step 730. Thus, if the primary network device is slow coming up and the backup network device becomes active, the primary network device preferably does not take over for the standby unless otherwise commanded to.

After entering the standby state in step 730, the network device enters a state in step 740 of receiving configuration commands from the active network device and waiting for failure of the active network device. So long as no failure of the active network device is detected, the standby network device remains in that state. If the active network device fails, then control is transferred to a step 750 and the standby network device becomes active. Control is then transferred to step 730 and the network device begins sending configuration commands along the failover cable and handling packets in accordance with its configuration.

Thus, which end of the failover cable is plugged in to each network device determines at power up whether that network device will be the primary network device or the backup network device. Each network device powers up defaulting to standby. If a network device is primary and determines that the backup network device has not already become active, then that network device becomes active and begins handling network traffic. An immediate switchover is prevented by the fact that the primary network device will not become active if it detects that the backup network device has not already become active.

Figure 8:
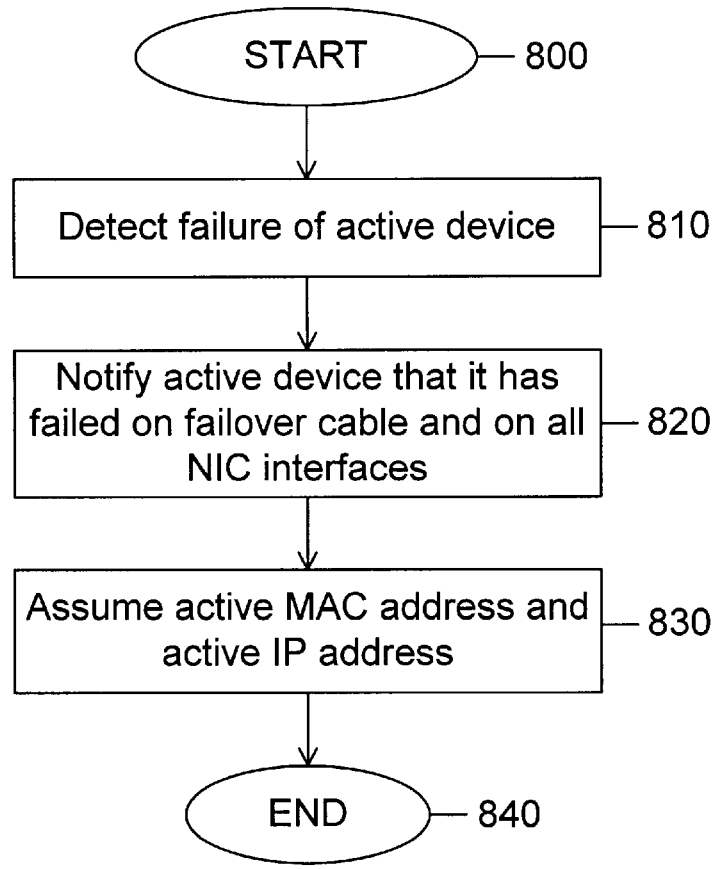
FIG. 8 is a process flow diagram illustrating the process that executes when a standby network device becomes active.

FIG. 8 is a process flow diagram illustrating the process that executes when a standby network device becomes active. The process starts at 800. In a step 810, the standby device detects the failure of the active device. Next, in a step 820, the standby device notifies the active device that the active device has failed. Next, in a step 830, the backup device assumes the MAC address and the IP address of the active device. Since the formerly active device which failed receives a message over the failover cable that it has failed, it assumes the standby MAC address and standby IP address. The switches to which the network devices are connection eventually learn the new IP address and MAC address configuration and adjust accordingly. The process ends at 840.

Thus, by taking over the active MAC address and the active IP address, the failover backup network device takes the place of the failed primary device on the network. Clients on the network which attempt to connect to the primary network device need never know that their connections are now being handled by a backup device since the backup device has the same IP address as the formerly active primary device had. In some embodiments, it is true that the backup device does not keep track of the state of all of the connections to the primary device and so all of the connections are dropped and reestablished to the backup device. However, the clients which reestablish the connections will not know that they are establishing the connection to a different device or that the primary network device failed. It is only be apparent to the client that for some reason, its connection was dropped.

Because the backup device assumes the active MAC address, it is not even necessary for each of the clients to ARP to find out a new MAC address that belongs with the IP address to which the client is attempting to connect. In the case of a Local Director, any traffic routed directly to the IP address of the Local Director is routed directly to the backup local director which has become active. In addition, as a result of switches learning the new location of the active MAC address, all traffic that was formerly routed through the primary local director is routed to the backup local director and the backup local director which became active is able to intercept packets just as the primary local director did when it was active.

Figure 9:
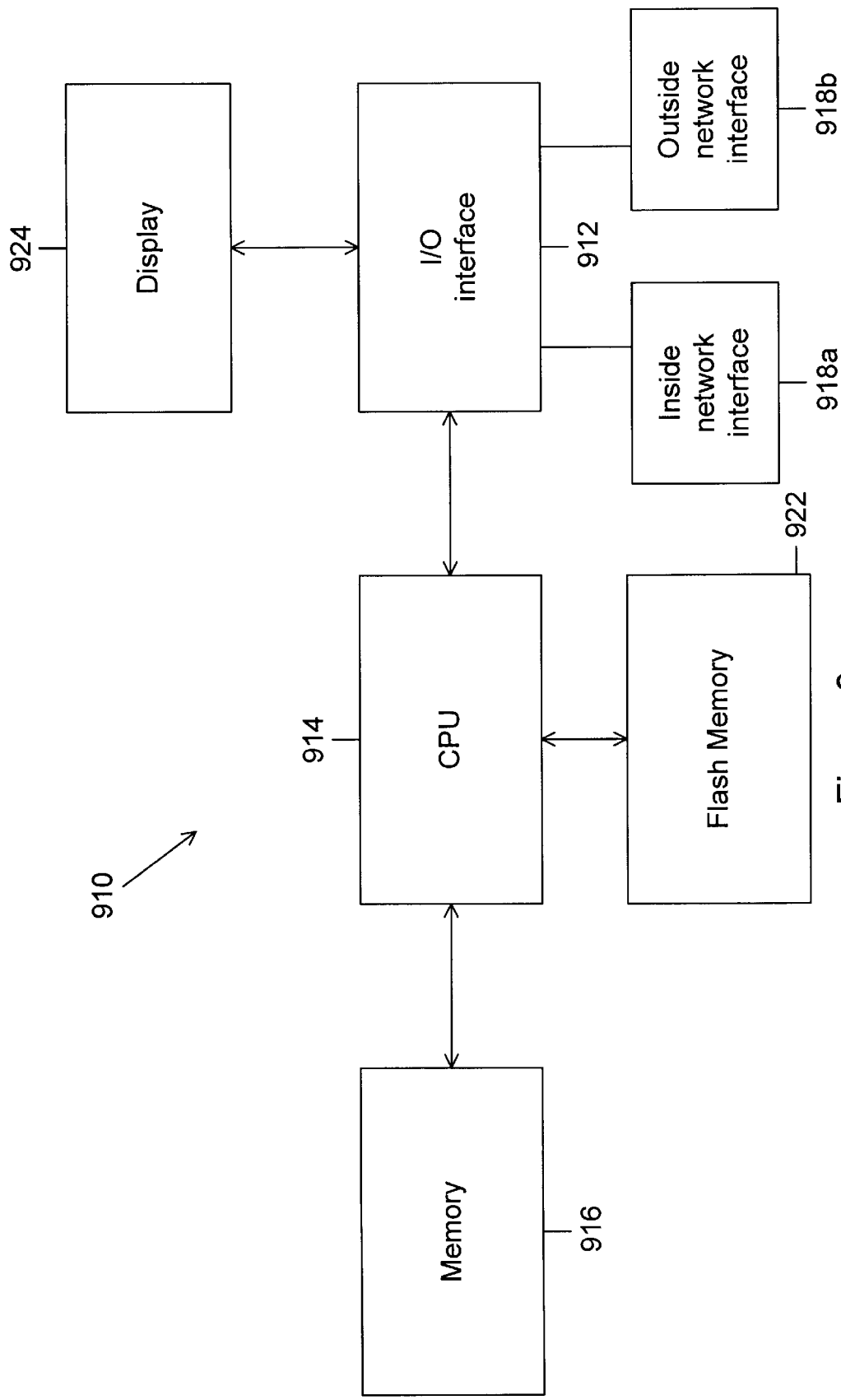
FIG. 9 shows a typical computer-based system which may be used as a failover or hot standby network device.

FIG. 9 shows a typical computer-based system which may be used as a failover or hot standby network device. Shown is a computer 910 which comprises an input/output circuit 912 used to communicate information in appropriately structured form to and from the parts of computer 910 and associated equipment, a central processing unit 914, and a memory 916. These components are those typically found in most general and special purpose computers 910 and are intended to be representative of this broad category of data processors.

Connected to the input/output circuit 912 are inside and outside high speed Local Area Network interfaces 918a and 918b. The inside interface 918a will be connected to a private network, while the outside interface 918b will be connected to an external network such as the Internet. Preferably, each of these interfaces includes (1) a plurality of ports appropriate for communication with the appropriate media, and (2) associated logic, and in some instances (3) memory. The associated logic may control such communications intensive tasks as packet integrity checking and media control and management. The high speed interfaces 918*a* and 918*b* are preferably multiport Ethernet interfaces, but may be other appropriate interfaces such as FDDI interfaces, etc.

The computer system may also include an input device (not shown) such as a keyboard. A flash memory device 922 is coupled to the input/output circuit 912 and provides additional storage capability for the computer 910. The flash memory device 922 may be used to store programs, data and the like and may be replaced with a magnetic storage medium or some other well known device. It will be appreciated that the information retained within the flash memory device 922, may, in appropriate cases, be incorporated in standard fashion into computer 910 as part of the memory 916.

In addition, a display monitor 924 is illustrated which is used to display the images being generated by the present invention. Such a display monitor 924 may take the form of any of several well-known varieties of cathode ray tube displays and flat panel displays or some other type of display.

Although the system shown in FIG. 9 is a preferred computer system of the present invention, the displayed computer architecture is by no means the only architecture on which the present invention can be implemented. For example, other types of interfaces and media could also be used with the computer.

Although the foregoing invention has been described in some detail for purposes of clarity of understanding, it will be apparent that certain changes and modifications may be practiced within the scope of the appended claims. For example, a two device system has been described including a primary and a secondary device that provides a single backup. In other embodiments, more than two devices are included in a system and more than a single backup is provided. It should be noted that there are may alternative ways of implementing both the process and apparatus of the present invention.. Accordingly, the present embodiments are to be considered as illustrative and not restrictive, and the invention is not to be limited to the details given herein, but may be modified within the scope and equivalents of the appended claims.

What is claimed is:

1. A method of transferring a network function from a primary network device to a backup network device comprising:

detecting at the backup network device mapped to a standby IP address that the primary network device mapped to an active IP address has failed;

sending a message from the backup network device to the primary network device indicating to the primary network device that the primary network device has failed;

mapping the IP address of the backup network device from the standby IP address to the active IP address;

mapping the IP address of the primary network device from the active IP address to the standby IP address; and handling packets sent to the active IP address with the backup network device.

2. A method of transferring a network function from a primary network device to a backup network device as recited in claim 1 further providing a failover cable between the primary network device and the backup network device.

3. A method of transferring a network function from a primary network device to a backup network device as recited in claim 2 further including sending copies of configuration commands executed on the primary network device to the secondary network device on the failover cable.

4. A method of transferring a network function from a primary network device to a backup network device as recited in claim 1 wherein the configuration of the backup network device mirrors the configuration of the primary network device.

5. A method of transferring a network function from a primary network device to a backup network device as recited in claim 4 further including changing the state of the backup network device from a standby state to an active state;

changing the state of the primary network device from the active state to the standby state; and intercepting packets at the backup network device according to the configuration of the primary network device.

6. A method of transferring a network function from a primary network device to a backup network device as recited in claim 1 further including:

changing the MAC address of the backup network device from a standby MAC address to an active MAC address;

changing the MAC address of the primary network device from a the active MAC address to the standby MAC address.

7. A method of transferring a network function from a primary network device to a backup network device as recited in claim 2 wherein the failover cable has a primary end and a secondary end and wherein the primary network device and the backup network device are elected from a first server and a second server according to the end of the failover cable that is plugged in to the first server and the second server.

8. A method of transferring a network function from a primary network device to a backup network device as recited in claim 2 wherein the primary network device periodically sends a signal on the failover cable indicating that the primary network device is not failed.

9. A method of transferring a network function from a primary network device to a backup network device as recited in claim 2 wherein the backup network device periodically sends a signal on the failover cable indicating that the backup network device is not failed.

10. A method of transferring a network function from a primary network device to a backup network device as recited in claim 8 wherein the backup network device determines that the primary network device is failed based on nonreceipt of the periodic signal on the failover cable.

11. A method of transferring a network function from a primary network device to a backup network device as recited in claim 2 wherein the primary network device periodically sends a signal on the network indicating that the primary network device is not failed.

12. A method of transferring a network function from a primary network device to a backup network device as recited in claim 2 wherein the backup network device periodically sends a signal on the network indicating that the backup network device is not failed.

13. A method of transferring a network function from a primary network device to a backup network device as recited in claim 11 wherein the backup network device determines that the primary network device is failed based on nonreceipt of the periodic signal on the network.

14. A method of transferring a network function from a primary network device to a backup network device as recited in claim 13 wherein the backup network device tests its network interface card before determining that the primary network device is failed based on the nonreceipt of the periodic signal on the network.

15. A method of transferring a network function from a primary network device to a backup network device as recited in claim 1 wherein the active status of the primary network device and the standby status of the backup network device is frozen when the failover cable is unplugged.

16. A method of transferring a network function from a primary network device to a backup network device as recited in claim 1 wherein the primary network device cannot become active after failing unless the primary network device is reset.

17. A hot standby network device for backing up a primary network device comprising:

means for detecting that the primary network device mapped to an active IP address has failed;

means for sending a message from the hot standby network device indicating that the primary network device has failed so that the active IP address will become available to the hot standby network device;

means for mapping the local IP address of the hot standby network device from a standby IP address to an active IP address; and means for handling packets sent to the active IP address with the hot standby network device.

18. A hot standby network device as recited in claim 17 wherein the hot standby network device handles data packets using the TCP/IP protocol.

19. A standby network device comprising:

a processor configured to detect that a primary network device mapped to a active IP address has failed;

an interface configured to send a message from the backup network device to the primary network device indicating to the primary network device that the primary network device has failed;

a memory configured to map the IP address of the backup network device from the standby IP address to the active IP address;

wherein the processor is further configured to handle packets sent to the active IP address when the IP address of the backup network device is mapped to the active IP address.

20. A standby network device as recited in claim 19 wherein a failover cable is connected between the primary network device and the backup network device.

21. A standby network device as recited in claim 20 wherein the failover cable has a primary end and a secondary end and wherein the standby network device is configured as a result of the end of the failover cable that is plugged into the standby network device.

22. A primary network device comprising:

an interface configured to receive a message from a backup network device mapped to a standby IP address indicating to the primary network device that the primary network device has failed;

a processor configured to detect that the primary network device should be failed as a result of the receipt of the message from the backup network device;

a memory configured to map the IP address of the primary network device from the active IP address to the standby IP address;

wherein the processor is further configured to handle packets sent to the standby IP address when the IP address of the primary network device is mapped to the standby IP address.

23. A primary network device as recited in claim 22 wherein a failover cable is connected between the primary network device and the backup network device.

24. A primary network device as recited in claim 23 wherein the failover cable has a primary end and a secondary end and wherein the standby network device is confined as a result of the end of the failover cable that is plugged into the standby network device.

\* \* \* \* \*